TELEPHONE REPERTORY DIALER

Filed July 14, 1965 4 Sheets-Sheet 1

INVENTORS D. D. HUIZINGA
T. B. PRINCE
BY E. J. Olinder
ATTORNEY

United States Patent Office 3,456,085
Patented July 15, 1969

3,456,085

TELEPHONE REPERTORY DIALER

Donald D. Huizinga and Terry B. Prince, Indianapolis, Ind., assignors to Bell Telephone Laboratories, Incorporated, New York, N.Y., a corporation of New York Filed July 14, 1965, Ser. No. 471,906
Int. Cl. H04m *1/26*
U.S. Cl. 179—90 7 Claims

ABSTRACT OF THE DISCLOSURE

In a repertory dialer telephone set apparatus for recording signal indicia of dialed digits is combined with an arrangement for selectively translating extracted portions of the stored signal indicia into either multifrequency pulses or into direct current pulses for application to a telephone line.

Figure 1A:
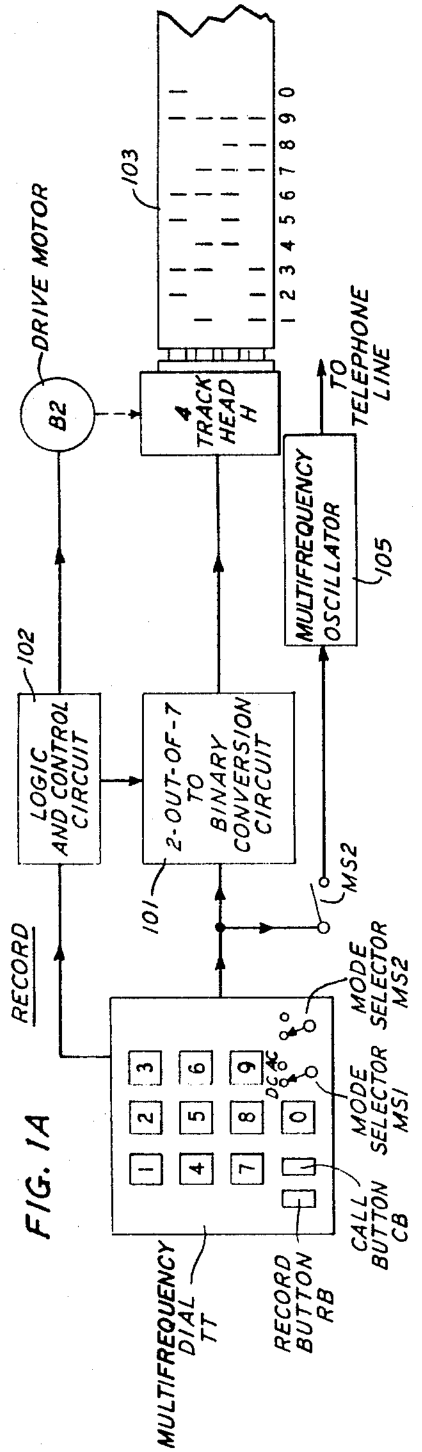

This invention relates to telephone repertory dialers and, more particularly, to repertory dialers of the Touch-Tone or multifrequency type.

Repertory dialers are automatic telephone call transmitters that enable subscribers to initiate calls by depressing a single key as opposed to dialing manually each digit of the called party's directory number. Basically, such apparatus comprises a register, typically a magnetic type storage medium, which is used to store dial generated signal indicia of a group of directory numbers. Additionally, means are provided, responsive to the operation of a single pushbutton, for selectively applying these indicia, or related signal indicia, to a telephone line for transmission to a central office.

One known type of repertory dialer utilizes a conventional rotary telephone dial to generate D-C pulses that are stored directly in the register or recording medium, which may be a magnetic drum or a magnetic tape, for example. In the CALL mode of operation, the recorded signals are extracted, amplified and applied directly to a telephone line. One example of a repertory dialer of this type is disclosed in Patent 2,593,647, issued to A. E. Johansen, Sept. 20, 1960.

With the advent of electronic central office switching systems, and, further, with the modification of many electromechanical switching systems to permit reception of multifrequency dial signals, a need was established for a repertory dialer with multifrequency signaling capability. One approach to meet that need is shown in Patent 3,128,351, issued Apr. 7, 1964, to L. A. Hohmann, Jr., F. W. Kinsman and T. P. Nenninger. Hohmann et al. disclose a repertory dialer wherein pushbutton dial generated two-tone signals are recorded directly on a magnetic drum. These recorded tones are sensed on command and applied directly to a telephone line.

A degree of distortion is inherent in the process of recording multifrequency signals and in the process of extracting such signals from storage. An approach to the solution of this distortion problem is disclosed by R. A. Miller and C. M. Taris in application Ser. No. 228,581, now Patent No. 3,243,517 filed Oct. 5, 1962. Miller and Taris employ a modified pushbutton dial that affords two basic modes of operation. In one mode, dial generated multifrequency signals are applied directly to a telephone line without storage. When storage of a directly number is desired, a second operational mode provides for the generation of D-C signals which correspond in terms of binary type code to each digit dialed by pushbutton operation. A multitrack recording head is employed to apply the D-C signal or signals to a magnetic drum, and it is the presence or absence of a signal on each of the parallel tracks of the drum that preserves the identity of the dialed digit. On readout, the head simultaneously senses the presence or absence of the recorded D-C signal indicia on each successive group of multitrack parallel recordings. This information is then translated into the conventional 2-out-of-7 multifrequency code which is utilized to initiate the generation of conventional dual-tone multifrequency signals for application to the telephone line.

A transition period of some substantial duration will be necessary to convert all telephone central offices for the reception of multifrequency signaling. During this interim, there will be a need for telephone repertory dialers of both the multifrequency and D-C signaling type. A continuing requirement for stocking two basically different types of telephone station apparatus to perform the same function is clearly undesirable from the standpoint of both marketing convenience and cost. A principal object of this invention is to eliminate this requirement.

In the field of data transmission there are circumstances that render the utilization of both multifrequency and D-C signaling desirable. Repertory signaling equipment often lends itself conveniently to certain data transmission applications, but relevant prior art systems are inadequate to exploit the potential advantages of such use. Experiments have been conducted, for example, with apparatus employing both a rotary and a pushbutton dial. Such apparatus is cumbersome and complex and is, accordingly, both unreliable and expensive.

Consequently, specific objects of the invention are to enhance the reliability and reduce the cost and complexity of dual-mode telephone repertory signaling apparatus.

The aforementioned and other objects are achieved, in accordance with the principles of the invention, by a telephone repertory dialer that stores signal indicia in response to the operation of a pushbutton dial and which automatically translates these recorded indicia, selectively, either into multifrequency signals or into D-C signals for transmission.

One aspect of the invention relates to the means employed for converting signals stored in the binary type code into conventional rotary-dial type D-C signals. Specifically, a conventional matrix of relays is utilized to convert the operation of a digit-representing pushbutton into a binary coded D-C signal for recording. In accordance with the principles of the invention, these coding relays are turned to account for a dual purpose in that they also play a part in converting the binary encoded recorded signals into rotary-dial type D-C signals. Additionally, in accordance with the invention, a rotatable motor-driven commutator having a coded pattern of conductive and nonconductive areas on the face thereof in contact with brush-type contacts is used in combination with the matrix relays to effect the translation indicated.

According, one feature of the invention relates to the dual function performed by a matrix of relays in translating binary type signals recorded in a repertory dialer into multifrequency signals in a 2-out-of-7 code and in translating such recorded signals into rotary-dial type D-C signals.

Another feature involves the utilization of a motor driven commutator to effect translation in a repertory dialer from signals recorded in a binary type code to conventional rotary-dial type D-C signals.

A further feature pertains to the selective generation by a telephone repertory dialer of either multifrequency signals or rotary-dial type D-C signals from signals stored in a recording medium by the operation of a pushbutton dial.

Figure 1B:
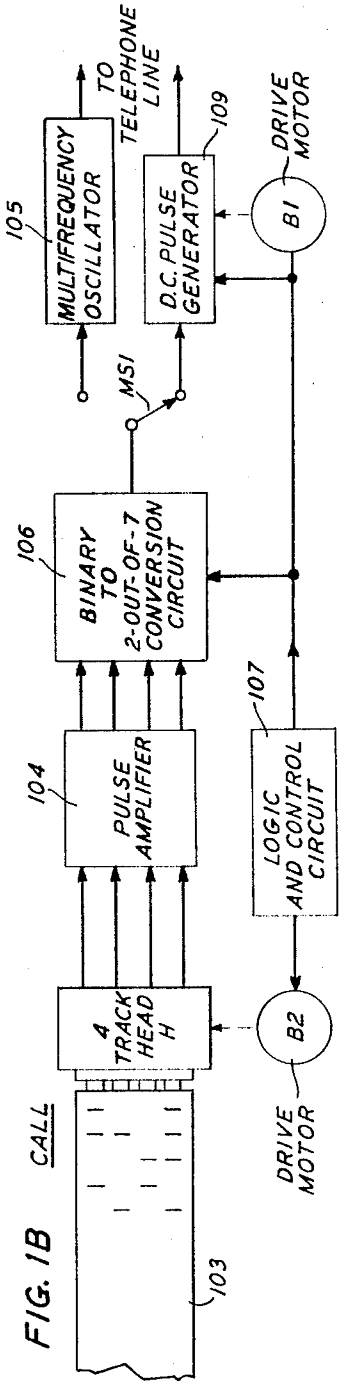

These and additional objects and features of the invention will be fully apprehended from the following detailed description of an illustrative embodiment and from the drawing in which:

FIGS. 1A and 1B together present a block diagram of a repertory dialer in accordance with the invention; and FIGS. 2, 3A and 3B, 4A and 4B, taken together, present a schematic circuit diagram of the logic and control circuit and D-C pulse generator for the CALL mode of operation shown in block form in FIG. 1B.

The apparatus shown in FIG. 1A which is used in the RECORD mode of operation is substantially identical to that disclosed in the application of Miller and Taris, cited above, and in an application Ser. No. 419,517, now Patent No. 3,364,314 filed by D. D. Huizinga and T. B. Prince on Dec. 18, 1964. Pushbutton dial TT includes the conventional 10 digit buttons, a button RB to initiate the record cycle and a button CB to initiate the call cycle. Mode selector switch MS2 determines whether multifrequency signals are applied directly to a telephone line by a multifrequency oscillator 105 or whether the actuation of a pushbutton is translated from conventional 2-out-of-7 multifrequency code signals to modified binary code signals for storage. With the proper setting of switch MS2, which may alternatively be combined with conventional switchhook contacts, and the operation of record button RB, both storage and calling out may be effected simultaneously. In the operational modes described that require storage, the pattern of signals applied from conversion circuit 101 to the 4-track head H is indicative of the digit dialed in terms of the modified binary code. As head H is stepped successively and longitudinally along magnetic storage tape 103, the pulses corresponding to each dialed digit are recorded, as shown, in groups transversely across the tape. The stepping of head H is actuated by drive motor B2, and proper sequencing of the entire operation is under the control of logic and control circuit 102.

In the CALL mode of operation, each group of pulses representing a stored digit is sensed simultaneously by head H, and each of the pulses so extracted is amplified by amplifier 104. After amplification, pulses are converted from binary form to the conventional 2-out-of-7 code by conversion circuit 106. The position of mode selector switch MS1 determines whether the output of conversion circuit 106 is applied to the multifrequency oscillator 105 or to D-C pulse generator 107. In the first case, the dialer operates as described in the Huizinga-Prince application cited above. In the latter case, the pulse generator 107, driven by motor B1, operates to apply conventional rotary-dial type D-C pulses to the telephone line. Overall sequencing and control of the CALL function is effected by logic and control circuit 107.

A complete understanding of the detailed circuitry shown in FIGS. 2, 3A, 3B, 4A and 4B may best be derived from the following description of a full cycle of operation in both the RECORD and CALL mode.

RECORD mode of operation

Figure 2:
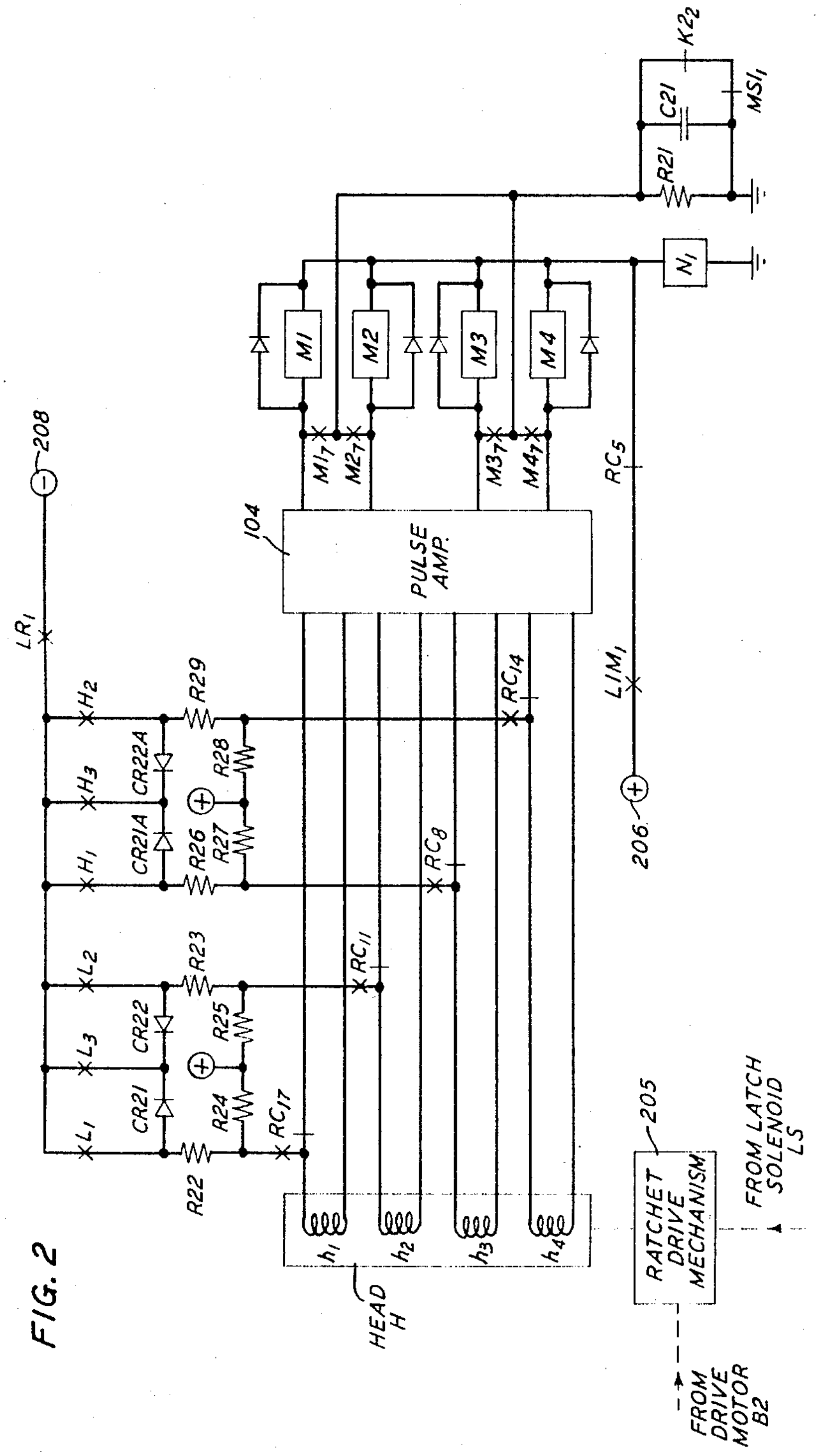
Figure 3B:
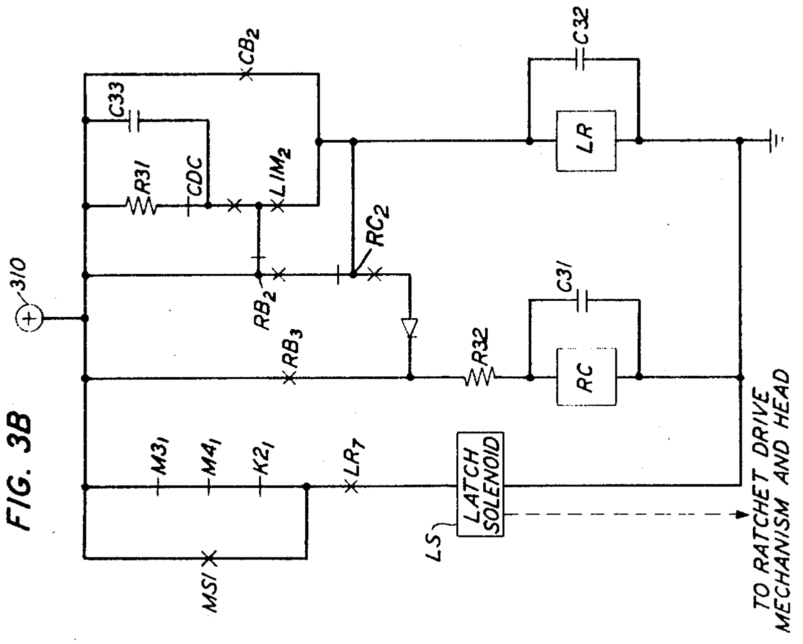
Figure 3A:
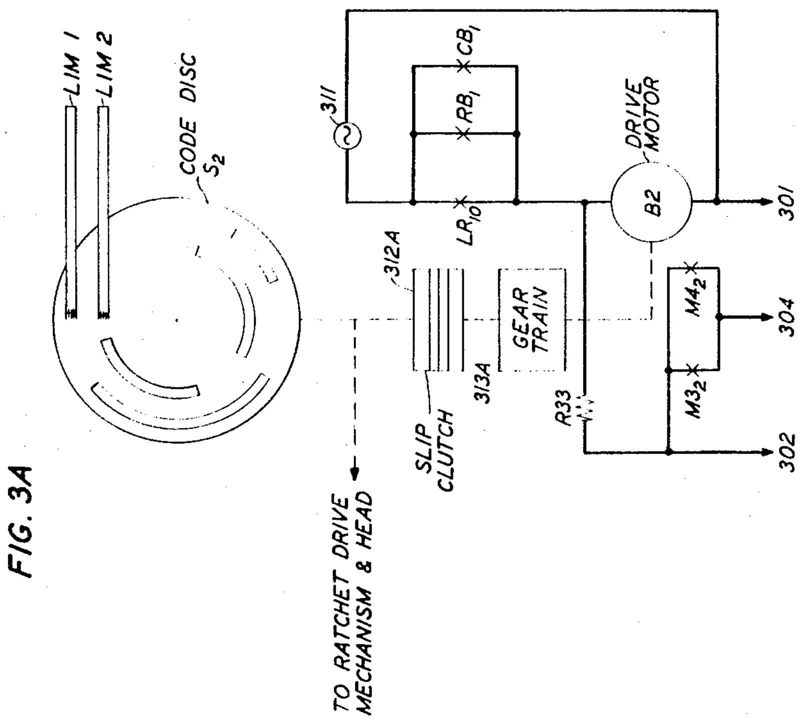

With switch MS1, FIG. 1, in the D-C position and with the operation of record button RB, FIG. 1, which is held operated during the RECORD mode, motor B2, FIG. 3A, operates over a conducting path from power supply 311, which path is completed by the operation of make contact $RB_1$. Relay LR, FIG. 3B, operates over a path from ground over break contact $RC_2$ and make contact $RB_2$ to power supply 310. Relay RC, designed with slow operate and slow release characteristics, operates over a similar path completed by make contact $RB_3$. With relay LR operated, latch solenoid LS operates from power source 310 over a path that includes break contacts $M3_1$, $M4_1$, $K2_1$ and make contact $LR_7$. Latch solenoid LS controls the application of stepping power to head H from motor B2 through ratchet drive mechanism 205, shown in FIG. 2. Details of this mechanism are fully disclosed by Huizinga et al., cited above. Voltage is applied to the record circuit from power source 208, FIG. 2, over make contact $LR_1$.

With relay RC operated, head H is connected to the record-erase circuit, which includes the L and H contacts, through make contacts $RC_{17,\ 11,\ 8\ \text{and}\ 14}$. Amplifier 104 is disconnected by the corresponding RC break contacts. Limit switch $LIM_2$ closes on commutator disc S2 to provide a path for the future operations of relay LR, FIG. 3B.

When relay LR is released by the opening of break contact $RC_2$, latch solenoid LS is released by the opening of make contact $LR_7$, and the voltage path to the record circuit is opened by contact $LR_1$, FIG. 2.

When a digit button on dial TT, FIG. 1, is depressed, one H contact and one L contact, FIG. 2, is closed to establish the corresponding code indication. With the depression of any digit button, common transfer contacts CDC, FIG. 3B, also operate. Operation of common transfer contacts CDC and make contact $LIM_2$ completes an operating path for relay LR, which remains operated for some brief period such as 50 milliseconds and applies a signal to one or more of the individual tracks of head H, in accordance with a modified binary type code, through contact $LR_1$ and operated ones of the L, H, and RC contacts. Voltage across any of the individual heads $h_1$ through $h_4$ results in the recording of a corresponding pulse on magnetic tape 103, as shown in FIG. 1. Head H is stepped to position for the next digit by latch solenoid LS that operates over a path completed by make contact $LR_7$, FIG. 3B.

The steps described immediately above are repeated for the recording of each successive digit. When a 14th digit has been recorded, head H and ratchet drive mechanism 205, FIG. 2, are stepped to an index position by latch solenoid LS. Limit switch $LIM_2$ opens the operating path for relay LR precluding its further operation in response to operation of any of the digit pushbuttons of dial TT. When record button RB, FIG. 1, is released, relay RC, FIG. 3B, is released by the opening of make contact $RB_3$, $RB_2$ contacts return to normal, and motor B2 is stopped when its power supply path is opened at contact $RB_1$. When relay RC releases, head H is transferred to the read circuit by the release of transfer contacts $RC_{17,\ 11,\ 8\ \text{and}\ 14}$.

If less than fourteen digits have been recorded, record button RB is released and relay LR operates over break contact $RB_2$ and limit switch contact $LIM_2$. Relay RC remains operated over a path that includes break contact $RB_2$, limit switch contact $LIM_2$ and make contact $RC_2$. Relay LR operated, keeps motor B2 operated over make contact $LR_{10}$, and latch solenoid LS operates over make contact $LR_7$.

With latch solenoid LS operated, commutator disc S2 and ratchet 205 rotate, driven through gear train 313A and slip clutch 312A, operating limit switch $LIM_2$. Both relays LR and RC are released by the release of limit switch $LIM_2$, latch solenoid LS is released by the opening of contact $LR_7$, and motor B2 is stopped by the opening of contact $LR_{10}$. With latch solenoid LS released, the ratchet of ratchet drive mechanism 205 is engaged in an index position.

CALL mode of operation

When call button CB, FIG. 1, is operated, with switch MS1 in the D-C position, motor B2 is operated over make contact $CB_1$ and relay LR operates over make contact $CB_2$. Limit switch $LIM_2$ on commutator S2 closes, keeping relay LR operated over break contact $RB_2$. With relay LR operated, motor B2 is kept operating by way of a supply path from power source 311 over make contact $LR_{10}$. Latch solenoid LS operates over its operating path, described above. With latch solenoid LS operated, the ratchet drive mechanism 205, FIG. 2, is released and head H is put in motion. At this point, limit switch $LIM_1$ on commutator disc S2 is closed and voltage from source 206, FIG. 2, is applied to matrix relays M1 through M4 over normally closed contact RC5. Recorded signals, as picked up from tape 103 by one or more of the individual heads $h_1$ through $h_4$ and amplified by amplifier 104 are applied to operate one or more of the matrix relays M1 through M4. The binary type coding is such that either or both relays M3 and M4 are operated for each digit.

With one or more of the matrix relays M1 through M4 operated, a dial code is set up by a combination of matrix relay contacts. These relays are held operated over a path to ground completed by normally closed contacts $K2_2$ and $MS1_1$. With either one or both of the M3 and M4 relays operated, latch solenoid LS releases inasmuch as one or both break contacts $M3_1$ and $M4_1$, FIG. 3B, open. When latch solenoid LS releases, the motion of head H is stopped, as no further driving force is applied through ratchet drive mechanism 205, FIG. 2.

Figure 4A:
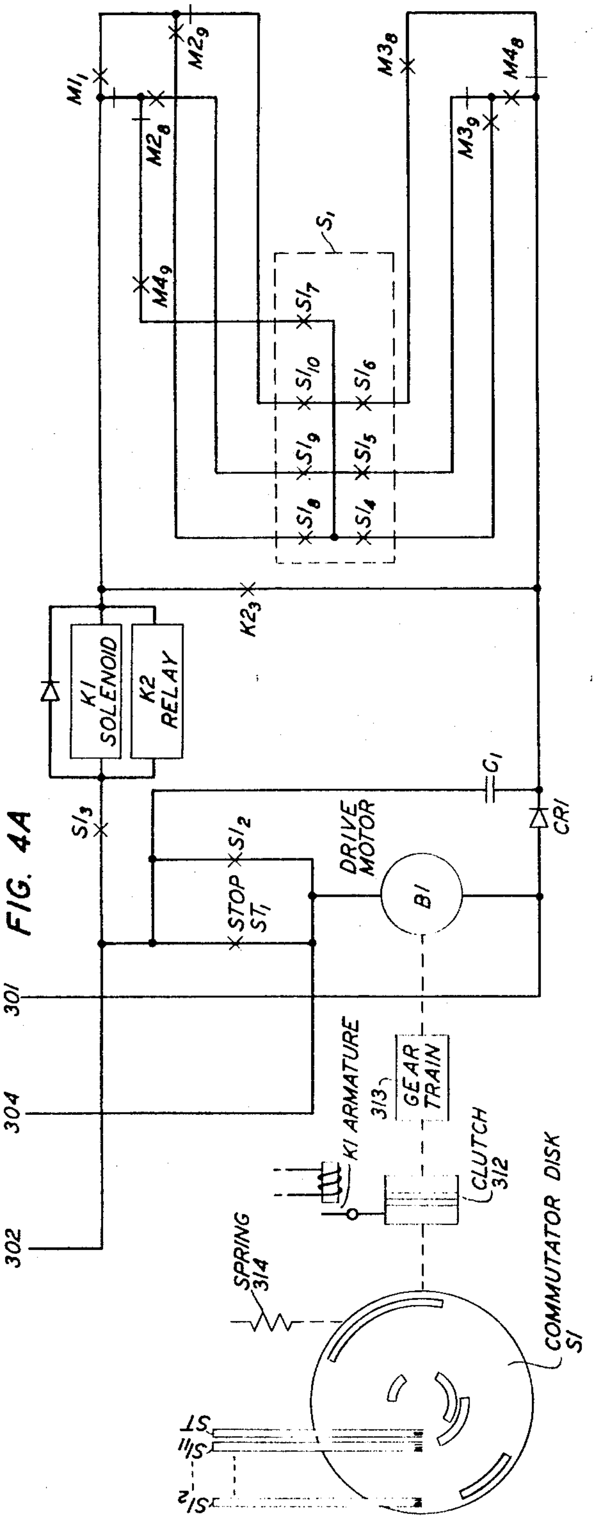
Figure 4B:
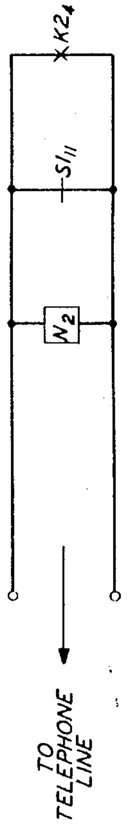

Motor B1, FIG. 4A, is started by the completion of an operating path which includes either of the contacts $M3_2$ or $M4_2$, FIG. 3A, and commutator disc S1 is rotated by motor B1 through gear train 313 and clutch 312.

Contact $S1_2$ closes to control the operation of motor B1, and contacts $S1_3$ closes to provide an operating path for solenoid K1 and relay K2. Pulses are applied to the telephone line by the pulsing of contacts $S1_{11}$, FIG. 4B. These pulses are identical in form and rate to pulses generated by a conventional rotary dial. Commutator S1 rotates until solenoid K1 and relay K2 operate through a combination of matrix relay contacts $M1_1$, $M2_8$, $M2_9$, $M4_9$, $M3_8$, $M3_9$ and $M4_8$ and commutator contacts $S1_4$ through $S1_{10}$.

Solenoid K1 opens clutch 312, FIG. 4A, allowing commutator S1 to fly back to a start position under the urging of spring 314. Pulsing contacts $S1_{11}$ are shorted out during fly back by the operation of make contacts $K2_4$, FIG. 4B. Solenoid K1 and relay K2 are held operated over make contact $K2_3$. With relay K2 operated, matrix relays M1 through M4 are released by the opening of break contact $K2_2$ as shown in FIG. 2. Latch solenoid LS is held unoperated by contact $K2_1$ as shown in FIG. 3B.

When commutator S1 returns to a start position, solenoid K1 and relay K2 are released by the opening of make contact $S1_3$, FIG. 4A, and motor B1 is stopped by the release of make contact $S1_2$. When relay K2 is released, latch solenoid LS operates over its normal operating path which includes break contact $K2_1$.

With the operation of latch solenoid LS the steps detailed above are repeated until all recorded digits of a selected recorded number have been translated and applied as conventional D-C dial pulses to the telephone line. Continuous movement of head H and commutator S2 is permitted if no recorded signal is sensed on tape 103 by head H.

When limit switch $LIM_1$ on commutator S2 opens, voltage source 206, FIG. 2, is removed from matrix relays M1 through M4. Limit switch $LIM_2$ on commutator S2 opens the operating path for relay LR and LR releases. Motor B2 is stopped by the opening of make contact $LR_{10}$. Latch solenoid LS is released through the opening of make contact $LR_7$, and the unit stops on the index position.

It is to be understood that the embodiment described is merely illustrative of the principles of the invention. Various modifications and changes thereto may be made by persons skilled in the art without departing from the spirit and scope of the invention.

What is claimed is:

1. A repertory dialer telephone set comprising, in combination, means for recording dialed digits in terms of signal indicia in the form of a binary type code, means for extracting said signal indicia from said recording means, first means for translating extracted ones of said signal indicia into corresponding multifrequency signal bursts for application to a telephone line, second means for translating extracted ones of said signal indicia into corresponding D-C pulse groups for application to a telephone line, the number of pulses in each of said groups being indicative of the corresponding digit dialed, and means for selectively operating either said first means or said second means.

2. A repertory dialer telephone set comprising, in combination, a pushbutton dial, means including a multitrack recording medium and a multitrack record-reproduce head responsive to the operation of a digit button on said dial for recording corresponding signal indicia on said recording medium in the form of a D-C pulse on one or more of said tracks of said recording medium, first means for translating said signal indicia into corresponding multifrequency pulses for application to a telephone line, second means for translating said signal indicia into corresponding groups of D-C pulses for application to a telephone line, the number of pulses in each of said groups being indicative of a dialed digit, and means selectively operable for enabling either said first means or said second means, said second means including a disc member having a coded pattern of conductive and nonconductive areas thereon, said first and second means including a common matrix of relays, means including a motor for rotating said disc, a plurality of brush-type contacts disposed against the surface of said disc, means including contacts on said relays for applying power to said motor thereby to rotate said disc, whereby said disc is rotated through an arc determined by recorded ones of said indicia, one pair of said brush-type contacts being operated thereby to generate said groups of D-C pulses.

3. A repertory dialer telephone set comprising, in combination, a pushbutton dial, means responsive to the actuation of one of the pushbuttons of said dial for recording signal indicia corresponding to the digit dialed, first means including a matrix of relays and a coded commutator having a plurality of electrical contacts in contact therewith for translating said indicia into rotary-dial type signals for application to a telephone line, second means including said relays for translating said indicia into multifrequency signals for application to a telephone line, and means for selectively operating either said first means or said second means.

4. A repertory dialer telephone set comprising, in combination, a pushbutton dial, a magnetic recording medium, a transducer in cooperative relation with said medium, means including motor means responsive to the successive operation of pushbutton of said dial for effecting a relative movement between said medium and said transducer and for applying signal indicia of digits dialed through said transducer to said medium, first means including a matrix of relays and a coded commutator having a plurality of electrical contacts in contact therewith for translating said indicia into rotary-dial type signals for application to a telephone line, second means including said relays for translating said indicia into multifrequency signals for application to a telephone line, and means for selectively operating either said first means or said second means.

5. Apparatus in accordance with claim 4 including means for applying rotational driving power from said motor to said commutator whereby one set of said contacts generates said dial type signals.

6. Apparatus in accordance with claim 5 wherein said last named means includes a clutch engageably responsive to the operation of a synchronizing relay, said last named relay having an operating path controlled in part by one set of said plurality of contacts and controlled in part by contacts of said matrix of relays.

7. A repertory dialer telephone set comprising, in combination, a pushbutton dial, means responsive to the operation of a pushbutton on said dial for recording first signal indicia in a first code corresponding to the digit dialed, first means for translating said first signal indicia into second signal indicia in a second code for application to a telephone line, second means for translating said first signal indicia into third signal indicia in a third code for application to a telephone line, and third means for selectively initiating the operation of said first means or said second means, fourth means directly responsive to the operation of said dial for applying signal indicia in said second code to a telephone line without previously recording said last named signal indicia, said third means including means for selectively operating said fourth means to the exclusion of said first and second means.

References Cited

UNITED STATES PATENTS

| | | | |
|---|---|---|---|
| 2,760,005 | 8/1956 | Williamson et al. | 179—90 |
| 3,040,133 | 6/1962 | Kobler et al. | 179—90 |
| 3,385,934 | 5/1968 | Fischer et al. | 179—90 |
| 3,387,098 | 6/1968 | Fischer et al. | 179—90 |
| 3,234,336 | 2/1966 | Wells | 179—90 |
| 3,243,517 | 3/1966 | Miller et al. | 179—90 |
| 3,280,269 | 10/1966 | Brown et al. | 179—90 |

KATHLEEN H. CLAFFY, Primary Examiner

ALBIN H. GESS, Assistant Examiner